United States Patent Office.

AUGUSTE BÉHAL, OF PARIS, FRANCE.

PROCESS OF MAKING ETHEREAL SALTS OF FORMIC ACID.

SPECIFICATION forming part of Letters Patent No. 648,580, dated May 1, 1900.

Application filed November 29, 1899. Serial No. 738,716. (Specimens.)

*To all whom it may concern:*

Be it known that I, AUGUSTE BÉHAL, of Paris, France, have invented certain new and useful Improvements in Processes of Making Ethereal Salts of Formic Acid, which are fully described in the following specification.

Hitherto no mixed anhydride of formic with other organic acids has been produced. I have found that such mixed anhydrides can be readily obtained by causing formic acid free from water to react on anhydrides of organic acids at moderate temperatures. The reaction is rapid, and the mixed anhydrides thus obtained may be characterized by the fact that they are decomposed in the cold by tertiary bases, (quinolin, pyridin, dimethlanilin,) disengaging plentifully carbon monoxid.

Autenrieth (*Ber. d. D. Chem. Ges.*, Vol. 20, p. 3187) has attempted to make mixed anhydrides by reaction between organic acids and acetic anhydride; but Rousset (*Bull. Soc. Chem.* 13, pp. 330 to 334) has shown that the products thus obtained are mere mixtures. By my process the reaction is between anhydrous formic acid and the anhydrides of organic acids, and the products are undoubtedly compounds—true mixed anhydrides. The reactions of these mixed anhydrides ($RCO.O.CHO$) on alcohols ($R_1.OH$) and on ammonia or substituted ammonias ($NH_2R_1, NHR_1R_2$) may be expressed by the following equations:

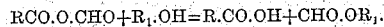
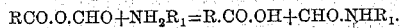
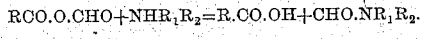

$$RCO.O.CHO + R_1.OH = R.CO.OH + CHO.OR_1.$$
$$RCO.O.CHO + NH_2R_1 = R.CO.OH + CHO.NHR_1.$$
$$RCO.O.CHO + NHR_1R_2 = R.CO.OH + CHO.NR_1R_2.$$

These mixed anhydrides act upon acyclic or cyclic alcohols to produce corresponding formic ethers. They also react on polyalcoholic bodies and on ammonia and substitution products of ammonia. Thus the formyl group in the mixed anhydride combines with the alcohol or the base, while the other group produces the corresponding acid. The reaction is the same with polyalcoholic compounds. Autenrieth's products, on the other hand, react with ammonia to form the amid of the acid next richer in carbon.

The following examples illustrate the preparation of these mixed anhydrides and of some of the bodies obtainable from them.

*Mixed formic-acetic anhydride.*—The formic-acetic anhydride is prepared by mixing equal molecular proportions of formic acid free from water and acetic anhydride, care being taken that the temperature does not exceed 50° centigrade. The mixed anhydride at once results. It is scarcely soluble in petroleum ether. By agitating the product of the reaction with petroleum ether a considerable portion of the acetic acid is removed. The portion not dissolved in the petroleum ether constitutes the raw mixed formic-acetic anhydride, which is purified by fractional and repeated distillation *in vacuo*. It is a body freely emitting vapor with a strong pungent odor. It is soluble in benzene, liquid at ordinary temperatures, and distils under atmospheric pressure at 105° to 118° centigrade, with partial decomposition and evolution of carbon monoxid. It distils at about 29° centigrade under eighteen millimeters' pressure. It is decomposed in the cold by tertiary bases, anhydrous sodium acetate, and the like, with abundant evolution of carbon monoxid.

*Mixed formic propionic anhydride.*—This is prepared by mixing equimolecular proportions of propionic anhydride and anhydrous formic acid. Heat is evolved and the product shows all the reactions of the mixed formic propionic anhydride. *In vacuo* it distils without change, but when distilled at the ordinary pressure it decomposes, carbon monoxid being evolved. Like formic acetic anhydride it decomposes in contact with quinoline, yielding carbon monoxid. It reacts with alcohols in the cold, giving formic ethers. For example, with hexylic alcohol it yields hexyl formate.

*Mixed formic iso-valeric anhydride.*—This is prepared in a similar manner. The evolution of heat is less marked than in the preceding cases. It reacts with alcohols, yielding formates. Thus with caprylic alcohol it yields capryl formate.

*Mixed formic iso-butyric anhydride.*—This is prepared like the preceding and reacts in a similar manner.

*Formate of capryl.*—To one molecular proportion of caprylic alcohol is added while cooling somewhat more than one molecular proportion of mixed anhydride, such as formic acetic anhydride. The reaction is very rapid. It is found unnecessary to isolate the mixed anhydride in a pure state, as the free acetic acid does not interfere with the reaction. On distilling the first portions are acetic acid and the more highly-rectified portions are formate of capryl. It is a liquid having an aromatic odor, boiling at 185° to 186° centigrade under ordinary pressure, without sensible alteration. Its density at 0° centigrade is 0.884. The same formate of capryl may also be prepared by using formic iso-valeric anhydride instead of formic acetic anhydride.

The formates of methyl, ethyl, propyl, isopropyl, butyl, iso-butyl, &c., can also be produced. Formate of capryl has been chosen merely as an example.

The formate of hexyl has been obtained by the same process both by use of formic acetic anhydride and by use of formic propionic anhydride.

*Formate of benzyl.*—This formate of an aromatic alcohol is obtained, as described, for formates of fatty alcohols. It is a liquid of pleasant odor, boiling at 200° to 203° centigrade under ordinary pressure. At 0° centigrade its density is 1.102.

*Formate of allyl; formate of cinnamyl.*—The formate of allyl, whose properties are known, is easily obtained by this process. By causing mixed formic-acetic anhydride to react in the cold upon cinnamine alcohol the formate of cinnamyl is very easily obtained. It is a body having aromatic odor, boiling under atmospheric pressure without decomposition at 250° to 254° centigrade, and crystallizing in a refrigerating mixture to melt at about 0° centigrade, at which temperature its density is 1.086.

*Diformate of glycol.*—This body is also prepared by the process described for formates of monovalent alcohols, but it must be rectified *in vacuo*. The same is done with phenyl-glycol. According to the proportions of the mixed anhydride the monoformate or diformate of phenyl-glycol is obtained.

*Formates of terpene alcohols.*—These bodies are readily prepared by the process. I have thus obtained the formates of borneol, iso-borneol, menthol, geraniol, linalool, citronellol, terpineol, &c., which have known characteristics. With anhydrous terpin is obtained terpin diformate, which boils at 176° to 177° centigrade under forty millimeters pressure and is a syrupy liquid having a density of 1.067 at 27° centigrade. The reaction also takes place with sesqui-terpenic alcohols. With caryophyllenic alcohol is obtained the formate of caryophyllenyl, whose density at 0° centigrade is 1.0266, boiling-point 167° to 170° centigrade, under twenty-seven millimeters pressure. With santalol is obtained the formate of santalyl, which boils at 175° to 178° centigrade under twenty-seven millimeters pressure and has density of 1.0180 at 0° centigrade.

*Formamid.*—Ammonia-gas is introduced into a solution of mixed anhydride in absolute ether, of which a considerable quantity has to be taken because formamid is only slightly soluble in ether. On cooling, when the solution smells strongly of ammonia-gas, the ether is separated by decanting from the crystals that are formed. The ether distilled leaves the formamid. Contrary to received data the formamid is very slightly soluble in ether. It crystallizes very easily at zero in long characteristic needles fusible at about 4° centigrade. It boils under a pressure of thirty-two millimeters without decomposition.

*Formanilid.*—To one molecular proportion of mixed anhydride while cooling is added, by degrees, about the corresponding quantity of anilin. The reaction product is washed with water acidified with hydrochloric acid. The oily residue is exhausted by means of benzene, which, distilled, leaves the formanilid. So, also, starting with methylanilin, there is obtained methyl-formanilid, which melts at 8° centigrade, is very slightly soluble in water, is very soluble in alcohol, and has at 0° centigrade a density of 1.107.

On starting with para-ethoxylanilin there is obtained formyl-para-ethoxylanilin, a crystalline body melting at 68.5° centigrade soluble in hot water and very soluble in alcohol.

On starting with ortho-amido-phenol there is obtained formyl-ortho-amidophenol, which melts at 129° centigrade, is very slightly soluble in benzene even when boiling, but is soluble in alcohol and in alkalies.

On starting with urea formyl-urea is obtained. With orthophenylenediamin methenylphenyleneamidin, melting-point 167° centigrade, is obtained.

Autenrieth (*Berichte der D. Chem. Ges.*, Vol. 20, p. 3190) says that he obtained valerylphenylhydrazin by causing phenylhydrazin to react with the mixture of acetic anhydride and valeric aldehyde, which mixture he considers to be the mixed acetic valeric anhydride; but when this latter compound is indeed used it is the formyl which combines with the phenylhydrazin, formylphenylhydrazin being produced. The process is as follows: One molecular proportion of formic acid is added to one molecular proportion of valeric anhydride, the whole being cooled. The product is regarded as the pure mixed anhydride. Next phenyl-hydrazin is dissolved in absolute anhydrous ether and the mixed anhydride is added thereto little by little, when formylphenylhydrazin is precipitated. It is dried in the air. The proportions are calculated in accordance with the equation:

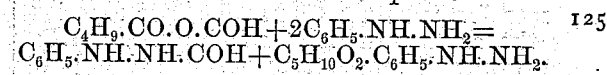

$C_4H_9.CO.O.COH + 2C_6H_5.NH.NH_2 =$
$C_6H_5.NH.NH.COH + C_5H_{10}O_2.C_6H_5.NH.NH_2.$

Having thus described the nature of this invention and the best means I know of carrying the same into practical effect, I claim—

1. The process herein described for the manufacture of mixed anhydrides of formic acid with other organic acids which consists in mixing, at a moderate temperature, equimolecular proportions of formic acid free from water and the anhydride of another organic acid.

2. The process herein described for the manufacture of ethereal salts of formac acid which consists in mixing, at a moderate temperature, the alcohol which is to supply the ethereal radical with a mixed anhydride of formic acid with another organic acid and fractionally distilling the product.

In witness whereof I have hereunto signed my name, this 17th day of November, 1899, in the presence of two subscribing witnesses.

AUGUSTE BÉHAL.

Witnesses:
JULES ARMENGAUD, Jeune,
I. ALLISON BOWEN.